July 14, 1942.  E. C. W. GEISTERT  2,289,645
APPARATUS AND METHOD FOR PREPARING BEVERAGES FOR CONSUMPTION
Filed Dec. 16, 1940  2 Sheets-Sheet 2

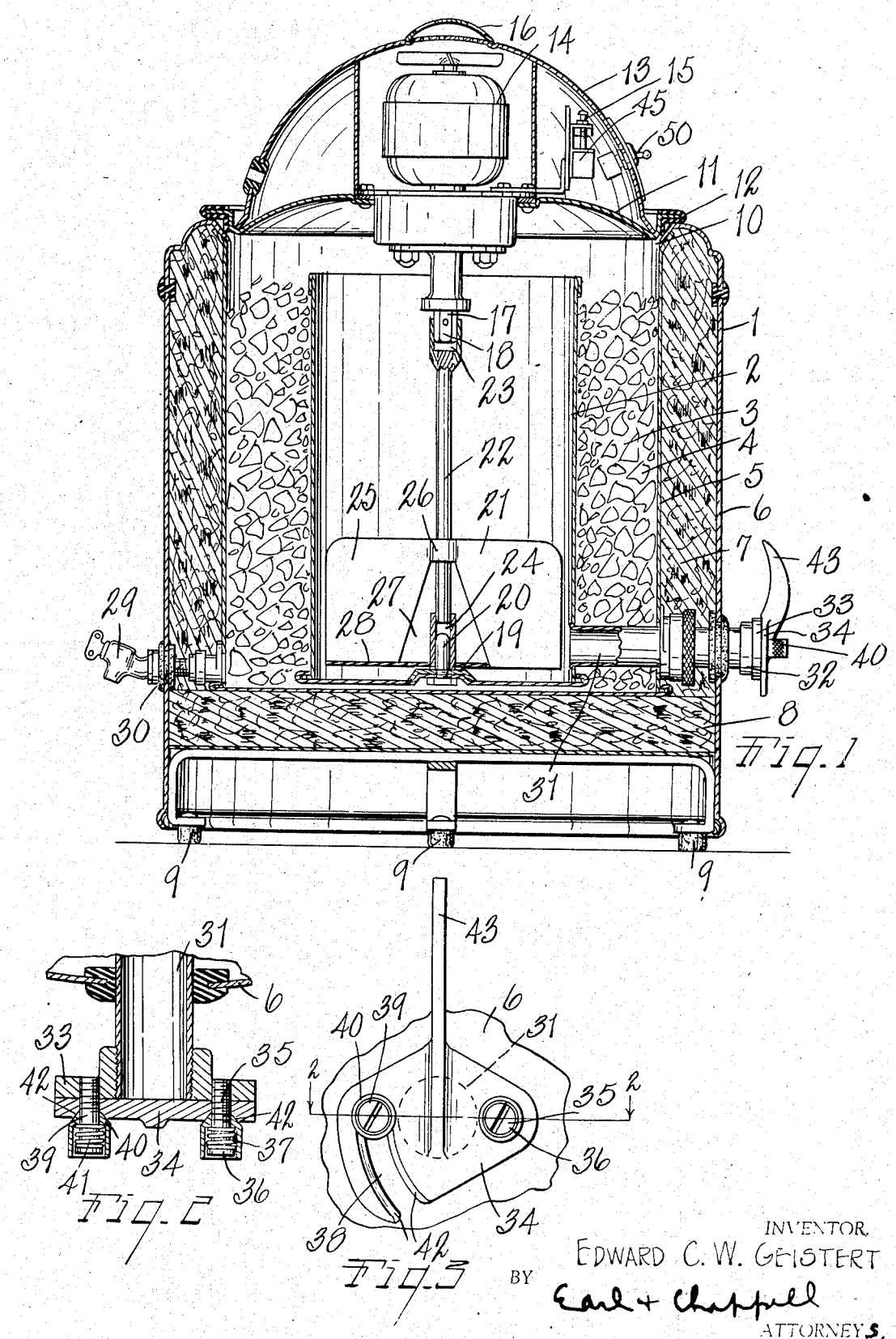

INVENTOR.
EDWARD C. W. GEISTERT
BY Earl & Chappell
ATTORNEYS.

Patented July 14, 1942

2,289,645

UNITED STATES PATENT OFFICE 2,289,645

APPARATUS AND METHOD FOR PREPARING BEVERAGES FOR CONSUMPTION

Edward C. W. Geistert, Grand Rapids, Mich., assignor to Froid Laboratories, Inc., Grand Rapids, Mich.

Application December 16, 1940, Serial No. 370,301

7 Claims. (Cl. 62—141)

This invention relates to improvements in apparatus and method for preparing beverages for consumption.

This invention relates to an apparatus and method for preparing beverages for consumption and particularly for freezing from the liquid of the beverages very fine crystals which do not dilute the beverage as would be the case if ice were added thereto. It has for its objects:

First, to provide a new and improved apparatus of the type referred to.

Second, to provide such an apparatus which is simple and inexpensive.

Third, to provide such an apparatus which is automatic in its operation and which will not only produce the desired icing of the beverage but which also operates simply and easily for withdrawing the beverage.

Fourth, to provide such an apparatus which may be easily cleaned and kept in a sanitary condition.

Fifth, to provide a new and improved method for icing beverages such as citrous fruit juices or beverages having a sugar content.

Other objects and advantages pertaining to details and economies of construction and operation will appear from the description to follow. A preferred embodiment of my invention is illustrated in the accompanying drawings, in which:

Fig. 1 is a drawing in section through my new and improved apparatus.

Fig. 2 is a detail sectional view taken on the line 2—2 of Fig. 3, showing the valve for withdrawing the beverage.

Fig. 3 is a partial view taken from the right of Fig. 1, showing the valve for withdrawing the beverage.

Figure 7:
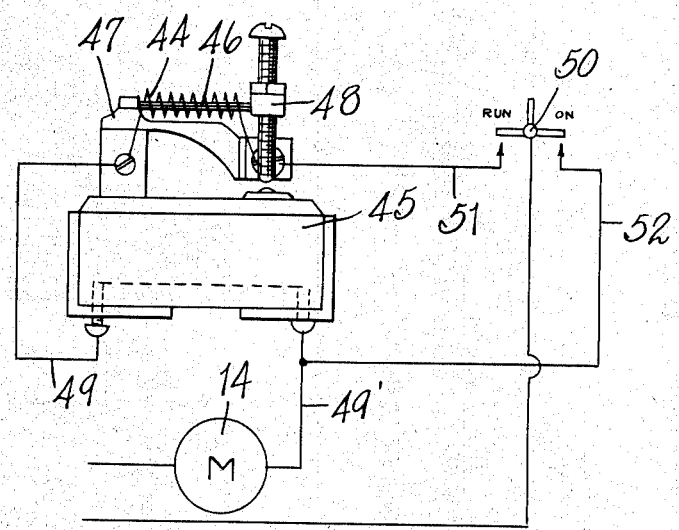
Fig. 7 is a wiring diagram showing the control for the operating motor.
Figure 5:
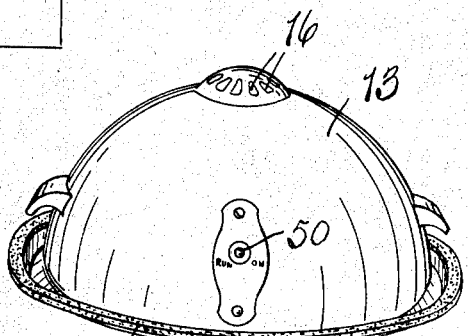
Fig. 5 is a view showing the cover therefor.
Figure 4:
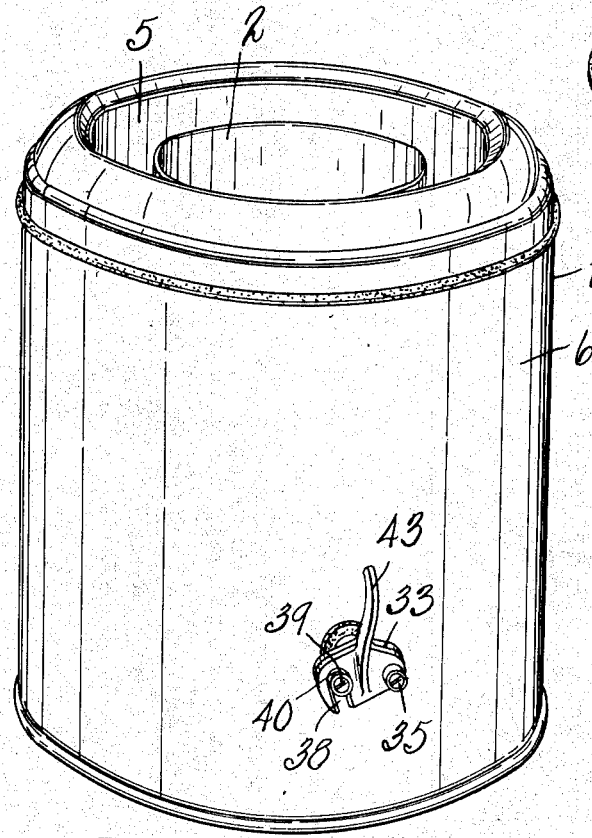
Fig. 4 is a perspective view of the freezing container of the apparatus.
Figure 6:
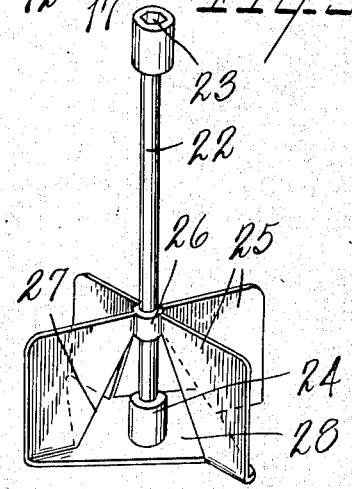
Fig. 6 is a perspective view showing the agitator which I prefer employing.

The freezing container 1 of my invention consists of a central container 2 around which is a refrigeration space 3 in which any suitable freezing means may be employed. I have shown ice lumps 4 to which salt is added. Outside of the refrigeration space are double walls 5 and 6 between which is a suitable insulation 7 such as rock wool. The bottom of the container may also be insulated as indicated at 8 and the container rests on rubber feet 9.

The top of the container has an opening 10 which communicates with both the central container 2 and refrigeration space 4, and a cover 11 provided with a suitable rubber gasket 12 closes this opening.

A concealing false cover 13 on the cover 11 conceals a motor 14 and a switch 15. Suitable ventilation openings 16 are provided.

The shaft 17 of the motor extends vertically and its lower end 18 is squared. At the bottom of the container 2 I provide a stepped bearing 19 having a projecting pin 20. The agitator 21 consists of a shaft 22 having a socket 23 squared to receive the squared end 18 of the motor shaft and having a hollow bearing or recess 24 to fit the pin 20. At the lower portion of the shaft 22 of the agitator, I provide fins 25 which are preferably four in number. These fins are fastened to a collar 26 which is fastened to the shaft 22 and, for most of their axial dimension, the fins 25 are cut away as shown at 27, to leave a space between the shaft and the fins to permit circulation of liquid. The bottoms of the fins are held by a plate 28.

The motor 14 has built in gears which cause the agitator to oscillate through a range of approximately 180°. This gearing is not shown in detail since it is a conventional gearing. The motor is of such a speed as to give approximately 80 oscillations per minute.

A suitable valve 29 is provided to drain the refrigeration space. This valve has a pipe 30 extending through the insulated double walls 5 and 6.

At the lower portion of the inner container 2 and extending through the refrigerating space and the double walls 5 and 6, I provide a straight, relatively large draw off tube 31. At the outer end of this tube, I provide a valve 32 which consists of a flat valve seat 33 and a plate valve 34 pivoted on a pin 35 for pivotal movement in the plane of the valve seat 33 which surrounds the outer end of the tube 31. At the outer end of the pin 35, I provide a head 36 which engages a spring 37 which tends to urge the plate valve 34 against its seat 33.

In the plate valve, I provide an arcuate slot 38 adapted to receive a headed pin 39 when the valve 38 is pivoted about the pin 35 to position to close the outer end of the tube 31. I provide a movable head 40 on the pin 39 and a spring 41 tending to urge the head toward the valve seat. At the edges of the slot 38, I provide cam portions 42 which wedgingly engage the head 40 of pin 39 and thereby tend to force the valve 34 against the seat 33. The touching faces of the valve seat 33 and the valve 34 may be ground and I provide a lever 43 for controlling the valve.

It will be apparent that the valve is very simple in construction and if made of stainless steel or nickel silver as preferred will resist corrosion. The use of the straight passage and the simple plate makes the cleaning thereof very simple and there are no crevices or corners for the accumulation of dirt or the breeding of bacteria.

The motor which drives the agitator is provided with suitable controls and to properly chill the beverage in order to obtain the minute ice crystals which I prefer, I provide an electric heater in the form of a coil 44 which is in circuit relationship with the motor and with a snap switch of conventional form indicated at 45 and controlled by a bimetallic element 46 which is in heat exchange relationship with the heater 44. The bimetallic element 46 is firmly mounted at one end on a suitable base 47 and the other end 48 is free to move up and down to control the switch 45. The motor 14 is connected to the snapping switch 45 by means of the wire 49' and the wire 49 joins the heater 44 with the switch. I provide a suitable two-way switch 50 which in one position energizes the circuit consisting of the heater 44, the switch 45 and the motor 14 through wire 51. In another position and through wire 52, this switch controls a circuit consisting of the motor only.

When the circuit consisting of the heater, the switch 45 and the motor 14 is energized, the agitator oscillates until the passage of current through the heater 44 moves the bimetallic element 46 and thereby opens the switch 45 which stops the operation of the motor. The motor then stands idle until the bi-metallic element has cooled sufficiently to close the switch 45, at which time the operation of the motor is resumed. This operation is continued cyclically while the beverage in container 2 is brought to its freezing point. During the rest periods of the agitator, the small ice crystals form and the agitator thereafter thoroughly distributes them through the beverage. When the beverage is properly chilled and it is desired to draw off some of it, the two-way switch 50 is turned to energize the motor only so that there will be continuous agitation during the drawing off of the beverage.

I have found that with fruit juices or the like it is desirable to obtain a temperature of about 27° F. in order to properly ice the beverage. In the device shown, I make use of a two gallon container and use in connection with it twenty pounds of ice and two pounds of salt. With this arrangement, I prefer to have the agitator in operation for half a minute and at rest for a minute. This is continued cyclically and the beverage which is drawn off contains about 25% ice crystals.

It will be apparent that my apparatus and method are particularly adapted to chilling fruit juices or the like and icing them. It will be apparent, of course, that it can be used in connection with other beverages. The apparatus is very simple and inexpensive and can be placed upon a counter or back bar to stimulate customer interest. The beverage can be drawn off very easily by the clerk in attendance and considerable time is saved. It is not necessary to mix the drink with ice at the bar, which has many advantages from the sanitary viewpoint as well as the time consuming viewpoint. It is a simple matter to clean the apparatus because of the simple valve and the straight draw-off passage and because of the easily removable cover and agitator.

The terms and expressions which have been herein employed are used as terms of description and not of limitation. There is no intention in using such terms and expressions of excluding any equivalents of the features shown and described or portions thereof. It is recognized that various modifications are possible within the scope of the invention claimed.

Having thus described my invention, what I claim as new and desire to secure by Letters Patent is:

1. In an apparatus of the class described comprising a freezing container, means for drawing liquid from said container, and an agitator in said container, the combination of an electric motor operatively connected to said agitator, an electric heating element, and means connecting said motor and said heating element in circuit relationship, a bimetallic element in heat exchanging relationship with said heating element, and a switch in circuit relationship with said motor and said heating element, and means connecting said switch to said bimetallic element whereby upon heating and cooling of said bimetallic element said switch is opened and closed whereby when the circuit comprising said motor and said heating element is energized the motor will operate intermittently, and a two-way switch and means electrically connecting one position of said switch into circuit controlling relationship with the circuit comprising said heating element, said first switch, and said motor, and means electrically connecting another position of said switch into circuit controlling relationship with said motor only whereby said motor may be operated intermittently for freezing beverages and continuously for drawing off beverages.

2. In an apparatus of the class described comprising a freezing container, and an agitator in said container, the combination of an electric motor operatively connected to said agitator, an electric heating element, and means connecting said motor and said heating element in circuit relationship, a bimetallic element in heat exchanging relationship with said heating element, and a switch in circuit relationship with said motor and said heating element, and means connecting said switch to said bimetallic element whereby upon heating and cooling of said bimetallic element said switch is opened and closed whereby when the circuit comprising said motor and said heating element is energized the motor will operate intermittently.

3. In an apparatus of the class described comprising a freezing container, means for drawing liquid from said container, and an agitator in said container, means for cyclically operating said agitator and for permitting it to remain at rest for short periods of time whereby a slush of ice crystals may be formed in a beverage in said container during the rest period of the agitator and said ice crystals may be dispersed during the operating period of said agitator.

4. The process of producing a beverage with ice crystals frozen from the liquid of the beverage suspended therein comprising bringing the beverage to its freezing point, agitating the beverage for one-half minute, permitting it to stand for one minute and repeating these steps cyclically while maintaining the beverage at its freezing point.

5. The process of producing a beverage with ice crystals frozen from the liquid of the beverage suspended therein comprising bringing the beverage to its freezing point, agitating the beverage for a short period, permitting it to stand for a period substantially twice as long as the period of agitation, and repeating these steps cyclically while maintaining the beverage at its freezing point.

6. The process of producing a beverage with ice crystals frozen from the liquid of the beverage suspended therein, comprising bringing the beverage to its freezing point, permitting it to stand for a short period until a slush of small crystals forms but not until these crystals agglomerate and then stirring the beverage to disperse said crystals throughout the liquid and to separate them and repeating the steps cyclically.

7. In an apparatus of the class described comprising a freezing container, means for drawing liquid from said container, and an agitator in said container, means for cyclically operating said agitator and for permitting it to remain at rest for short periods of time, whereby a slush of ice crystals may be formed in a beverage in said container during the rest period of the agitator and said ice crystals may be dispersed during the operating period of said agitator, and means for controlling said means for operating said agitator for rendering it operative to continuously operate said agitator, whereby said agitator may be operated continuously during the drawing of liquid from said container.

EDWARD C. W. GEISTERT.